UNITED STATES PATENT OFFICE.

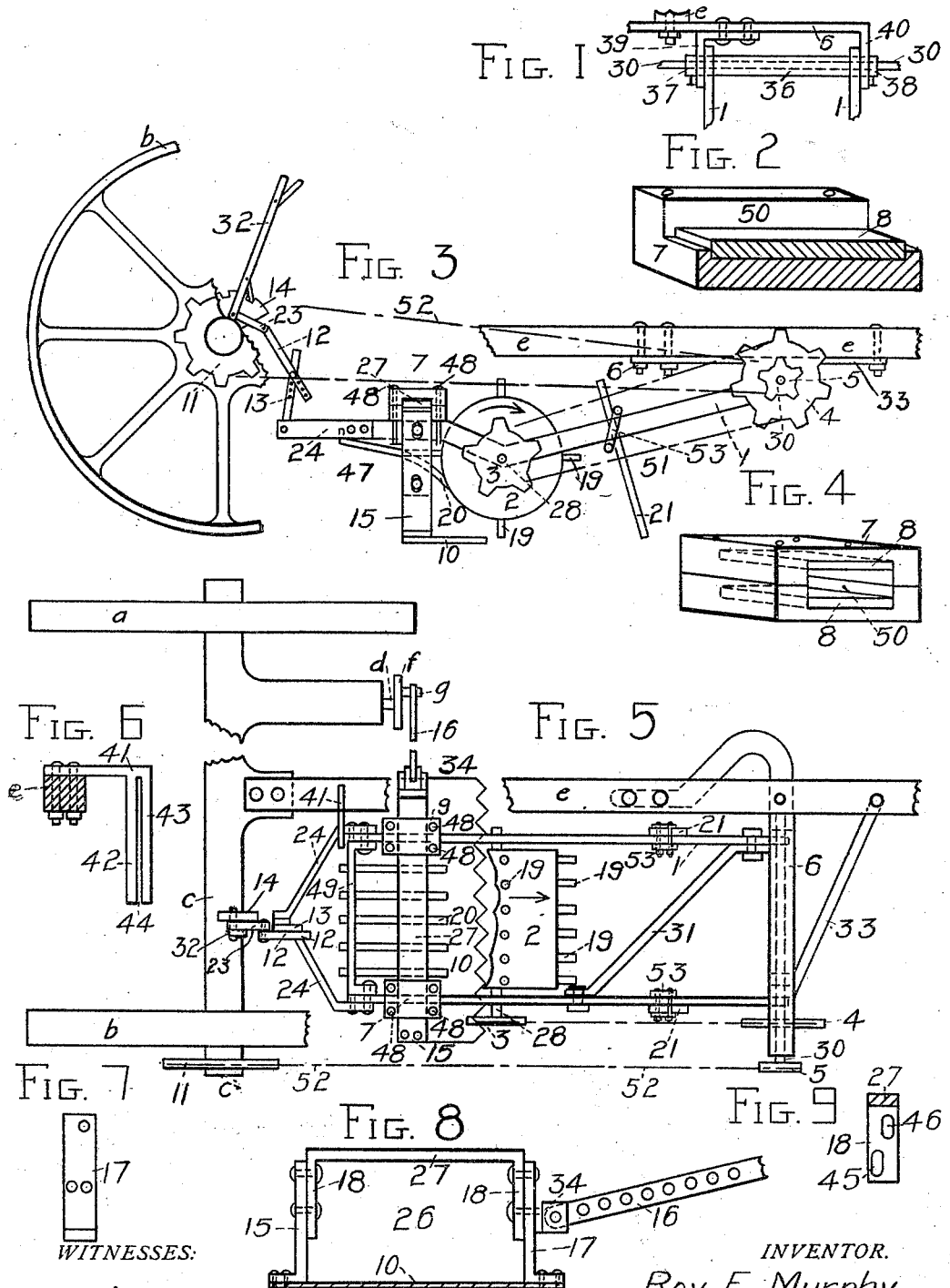

ROY E. MURPHY, OF COLORADO SPRINGS, COLORADO, ASSIGNOR, BY DIRECT AND MESNE ASSIGNMENTS, TO THE MURPHY BEET TOPPER COMPANY, A CORPORATION OF COLORADO.

BEET-TOPPING ATTACHMENT FOR MOWING-MACHINES.

957,896. Specification of Letters Patent. Patented May 17, 1910.

Application filed March 22, 1909. Serial No. 484,868.

*To all whom it may concern:*

Be it known that I, ROY E. MURPHY, a citizen of the United States, residing at Colorado Springs, county of El Paso and State of Colorado, have invented a new and useful Beet-Topping Attachment for Mowing-Machines, of which the following is a specification.

My invention relates to improvements in beet topping machines in which a sickle is made to vibrate rapidly, transversely to the length of the row of beets from the crank wrist and pitman of the mowing machine and is carried on a frame adjustably attached to the side of the tongue of the mowing machine, which frame is automatically adjusted vertically by a roller or gage wheel, so as to be moved up and down to adjust the sickle to the height of the beets, and has provided means for forcing the beet tops against said oscillating sickle till they are cut off from the body of the beet tuber and then conveying them away so as to obviate the possibility of clogging, and the objects of my invention are: First to provide a machine for removing the tops from beets in the row in the ground. Second, to provide a means for the automatic adjustment of said machine to the beets. Third, to attach said machine to a common mowing machine. I attain these objects by the mechanism illustrated in the accompanying drawing, in which:—

Figure 1, is an upright rear view of the mechanism supported on cross arm 6. Fig. 2, is a perspective, on a larger scale, of a part of the under half of the boxing showing the bottom bushing plate 8. Fig. 3, is a side elevation of the beet topping attachment shown connected with the front right side of a common mowing machine with parts of the mowing machine removed. Fig. 4, is a perspective on a larger scale of one of the boxings 7, and 9, showing the race way 50. Fig. 5, is a top view of the beet topping attachment connected with the front and right side of a common mowing machine. Fig. 6, is a rear elevation of the guide fingers 42, 43, connecting the rear end of the tongue, with the triangular frame 24. Fig. 7, is a right side elevation of the edge of the upright 17, on frame 26, of Fig. 8. Fig. 8, is a rear elevation of the frame 26, which comprises the race bar 27, the two angle arms 18, 18, the upright 15 and the upright 17. Fig. 9, is an inside elevation of one of the angle arms 18, 18, of frame 26, of Fig. 8.

Similar letters and figures refer to similar parts throughout the several views.

The cross arm 6, the two bars 1, 1, the triangular frame 24, 24, the gage wheel 2, the cleaning fingers 20, 20, the race bar 27, with the uprights 15, and 17, carrying the sickle blade 10, in combination with the frame of a common mowing machine, constitute the principal parts of my beet topping attachment. The cross arm, 6, is herein shown rigidly attached to the right side of the tongue of a right-cut mowing machine from which the sickle bar and its supports have been removed. This cross arm 6, is also connected to the tongue by the stay bar 33. From the under side of the cross arm 6, project downwardly the angle bracket arm 39 and the angle arm 40. Through these two arms is passed the long boxing 36, which projects flush with the outer sides of the two brackets. This long boxing 36, passes through the front end of each of bars 1, 1. Through the long boxing 36, passes the shaft 30, to the right end of which are attached rigidly the intermediate sprocket wheels 4, and 5. The shaft 30, turns in the long boxing 36, and is provided near its left end with the adjustable collar 37, and near its right end with the adjustable collar 38.

The bars 1, 1, are attached rigidly at their rear end to the triangular frame 24, 24, and the flange bar 49, which makes a solid frame pivoted at its front end and connected at its rear end to the lifting lever 32, of the mowing machine proper, by means of the lifting pitman 13, and the connecting pitman 12, connected to the lever arm 23, of lifting lever 32.

On top of the bars 1, 1, and near their rear end are clamped the right hand boxing 7, and the left hand boxing 9, respectively, in such a manner that they may be adjusted forwardly and backwardly as desired by means of the bolts 48, 48. In the boxings 7, and 9, is provided the race way 50, suitable to receive the race bar 27, carrying the sickle blade 10, connected by uprights 15, and 17, to angle arms 18, 18.

On the arms 1, 1, and in front of race bar 27, is the drum wheel 2, rigidly attached to shaft 28, which is made to turn forward on top by means of the sprocket wheel 3, rigidly attached on the same shaft 28, with gage wheel 2, and operated by means of sprocket wheel 3, which is actuated by intermediate wheel 4, which in turn has been actuated by the small intermediate sprocket wheel 5, which is operated by a sprocket chain 52, on drive sprocket 11.

On the convex surface of gage wheel 2, are the cleaning arms 19, 19, projecting a short distance from its surface and made to force the leaves and tops and other vegetation or debris, which may be in a row of beets or other vegetation, against the front edge of sickle blade 10, and also to force such beet tops or other debris, or vegetation backward over the top of the sickle blade 10.

To prevent the beet tops or other debris from clogging on the cleaning arms 19, 19, and clinging around the gage wheel 2, there are provided the cleaning fingers 20, 20, which rest at the front and press against the rear under side of the convex surface of the gage wheel 2, above the front edge of the sickle blade 10, and between the sets of the cleaning arms 19, 19. These cleaning fingers 20, 20, are firmly attached to the flange bar 49, rigidly connecting the rear ends of bars 1, 1, where they join the bars of the frame 24, 24.

The diagonal brace 31, connecting the two bars 1, 1, by means of bolts rigidly attached thereto, is to strengthen the frame and prevent it from careening or bending backwardly from its true shape. The two elevating fingers 21, 21, are rigidly attached to the sides of the bars 1, 1, by means of the clamps 53, 53, near the front end and are made adjustable by moving said clamps forward or backward or by sliding the fingers up or down as desired, for the purpose of more thoroughly gathering up the leaves, that are spraddled out from the row. The race bar 27, carrying the sickle blade 10, is operated transversely to the line of travel of the machine and across the row of beets by means of the coupling 34, attached to upright 17, being driven by the driving pitman 16, connected to the wrist $g$ of the mowing machine proper, which is attached to the fly wheel $f$, rigidly attached to and turning with the pitman shaft $d$, of the mowing machine. The sickle blade 10, can be adjusted up or down to vary the distance between it and the gage wheel 2, by means of the lower slotted holes 45, 45, and the upper slotted holes 46, 46, in the angle arms 18, 18, of the race bar 27, and can be adjusted forward or backward by sliding the boxings 7, and 9, forward or backward on the bars 1, 1.

To prevent the rear end of triangular frame 24, 24, from vibrating sidewise from the action of the driving pitman 16, there is provided the horizontal bar 41, rigidly attached to the top of the tongue $e$, near its rear end and having at its right end the left guide finger 42, and the right guide finger 43, fitting on the left hand side and right hand side, respectively, of the left triangular frame 24, which frame slides freely up and down in the aperture 44, between said guide fingers, 42, and 43.

In each of the boxings 7, and 9, are placed two bushing plates 8, 8, between which the race bar 27, slides. These bushing plates are provided to receive the friction and so that a comparatively tight race may be maintained by bushing up between bushing plate 8, and the frame of the boxing, or by inserting a new bushing plate 8, as desired.

The sickle blade 10, is provided with serrated teeth or notches at its front edge and operates to cut the tops by being forced transversely to the course of the machine at a rapid vibration and by being forced forward by the motion of the machine.

$a$, and $b$, are drive wheels, and $c$, the axle, and $e$, the tongue of a common mowing machine showing a right hand cut with so much of the machine shown as to explain the manner of how the attachment is connected to a mower of a right hand cut, but I reserve the right to connect the attachment of a left hand cut as well.

The sickle blade 10, is constantly at the command of the operator of the mowing machine to be raised or lowered by means of the lifting lever 32, while the machine is in operation, and can be raised up clear from the ground in moving from place to place by the same means, and can be held up by means of notched detent 14 shown in Fig. 3. The blade 10, is also adjusted up and down by means of gage wheel 2, riding on top of the row of beets.

The sprocket wheels 4, and 5, are adjusted to the sprocket wheel 11, on drive wheel $b$, by means of adjusting the adjustable collars 37, and 38, which are rigidly and adjustably attached to the shaft 30, by means of set screws.

I claim:

1. In a beet topping attachment, the race bar 27, having angle arms 18, 18, provided with slotted holes 45, and 46, having rigidly and adjustably attached thereto the upright angle bars 15, and 17, carrying at their lower extremity the sickle blade 10, substantially as set forth and for the purposes specified.

2. In a beet topping attachment of the class described, a serrated sickle blade rigidly attached at each end to upright angle bars 15, and 17, near the tops of which are bolts attaching them adjustably to down extending angle arms 18, 18, of a race bar 27, all substantially as set forth and for the purposes specified.

3. In a beet topping machine of the class described, the race bar 27, having down projecting angle arms upon which is suspended the sickle blade 10, means for operating same from the driving gear of a mowing machine, boxings carrying the said race bar 27, and supported on the adjustable frame 1, 1, substantially as set forth and for the purposes specified.

4. In a beet topping attachment for mowing machines, the race bar 27, having the angle arms 18, 18, provided with the slotted holes 45, and 46, for the adjustable and rigid attachment of the angle bars 15, and 17, the angle bars 15 and 17 and having suitable means for vibrating same from the gear mechanism of the mowing machine, in combination with the sickle blade 10, substantially as set forth and as specified.

5. In a vegetable topping attachment for mowing machines, the race bar 27, having the angle arms 18, 18, the angle arms 15, and 17, rigidly attached thereon, the serrated sickle blade 10, with means for operating same, substantially as set forth.

6. In a beet topping attachment for mowing machines, the sickle frame 26, consisting of the race bar 27, having the angle arms 18, 18, with upright 15, and upright 17, rigidly attached thereto, the serrated sickle blade 10, rigidly attached at both ends to the uprights 15, and 17, with means for operating same by the pitman 16, substantially as set forth.

7. In a beet topping attachment for mowing machines, the race bar 27, the race way 50, 50, the boxings 7, and 9, each provided with bushing plates 8, 8, and adjustably and rigidly attached on the bars of a frame pivotally attached to the side of the tongue of the machine, so as to have a free, vertical motion, substantially as set forth.

8. The race bar 27, the uprights 15, and 17, the serrated sickle blade 10, in combination with the gage wheel 2, provided, with chain gears to rotate it forward on top, and with a frame connecting it directly with said race bar 27, substantially as set forth and for the purpose specified.

ROY E. MURPHY.

Witnesses:
FRED E. MEFFORD,
PARIS HIATT.